United States Patent
Jantzi et al.

(10) Patent No.: US 11,310,322 B2
(45) Date of Patent: Apr. 19, 2022

(54) METHOD AND SYSTEM FOR PAIRING A CHASSIS AND CONTAINER IN AN ASSET TRACKING SYSTEM

(71) Applicant: BlackBerry Limited, Waterloo (CA)

(72) Inventors: Jason Wayne Jantzi, St Clements (CA); Mahendra Fuleshwar Prasad, Waterloo (CA); Yu Gao, Waterloo (CA); Mark Edward Reaume, Waterloo (CA); Scott Leonard Dill, Paris (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 16/690,797

(22) Filed: Nov. 21, 2019

(65) Prior Publication Data

US 2021/0160327 A1     May 27, 2021

(51) Int. Cl.
| | |
|---|---|
| *G06F 15/16* | (2006.01) |
| *H04L 67/141* | (2022.01) |
| *G06Q 50/28* | (2012.01) |
| *H04L 67/12* | (2022.01) |
| *H04L 67/52* | (2022.01) |

(52) U.S. Cl.
CPC ........... *H04L 67/141* (2013.01); *G06Q 50/28* (2013.01); *H04L 67/12* (2013.01); *H04L 67/18* (2013.01)

(58) Field of Classification Search
CPC .......................... H04L 67/141; G06Q 10/0833
See application file for complete search history.

(56) References Cited

U.S. PATENT DOCUMENTS

| | | | |
|---|---|---|---|
| 7,936,271 B2 | 5/2011 | Karr et al. | |
| 8,965,730 B2 | 2/2015 | Yuen | |
| 8,994,546 B2 | 3/2015 | Breed et al. | |
| 9,237,393 B2 | 1/2016 | Abrahamsson et al. | |
| 9,297,882 B1* | 3/2016 | Bhatia | G01S 5/0289 |
| 10,149,041 B2 | 12/2018 | Qian et al. | |
| 10,307,085 B2 | 6/2019 | Sales et al. | |
| 2013/0324152 A1 | 12/2013 | Lee et al. | |
| 2015/0095255 A1* | 4/2015 | Hall | G06Q 10/0833 |
| | | | 705/333 |
| 2016/0304054 A1 | 10/2016 | Mansuri et al. | |
| 2016/0366713 A1* | 12/2016 | Sonnino | H04W 4/80 |
| 2017/0094389 A1 | 3/2017 | Saulsbury et al. | |
| 2019/0279494 A1 | 9/2019 | Raasch et al. | |
| 2020/0258038 A1* | 8/2020 | Burch, V | B64F 1/222 |
| 2020/0273268 A1* | 8/2020 | Bhattacharyya | H04W 4/40 |

FOREIGN PATENT DOCUMENTS

WO     2019032360 A1     2/2019

OTHER PUBLICATIONS

Extended European Search Report, EP Application No. 202006864. 9, dated Mar. 26, 2021.

\* cited by examiner

*Primary Examiner* — Yves Dalencourt

(74) *Attorney, Agent, or Firm* — Moffat & Co

(57) ABSTRACT

A method for pairing a first computing device with a second computing device, the method including: detecting motion at the first computing device; determining, at the first computing device, that a pattern of the detected motion corresponds with a saved motion pattern; and activating a communications subsystem on the first computing device based on the determining to begin a pairing process.

16 Claims, 12 Drawing Sheets

METHOD AND SYSTEM FOR PAIRING A CHASSIS AND CONTAINER IN AN ASSET TRACKING SYSTEM

FIELD OF THE DISCLOSURE

The present disclosure relates to the transportation of goods, and in particular relates to the tracking of shipping containers for goods.

BACKGROUND

In an asset tracking ecosystem, determining the location of assets is important. Intermodal freight transportation, which involves the transportation of freight in an intermodal container that can be placed on a truck, ship or rail without the handling of freight itself, allows for the movement of goods in a seamless fashion.

However, it may be difficult to determine in a container yard with many containers and many vehicles in close proximity to each other which vehicle is associated with each container. Further, if the container and chassis are stationary in a static location then the task of finding the association is even more difficult.

In particular, in a typical scenario, a multitude of containers exist in such container yards and are individually lifted onto a vehicle such as a truck chassis or a railcar/train chassis. However, while still in the container yard, it may be difficult to identify which truck chassis or train chassis and which container are associated with each other.

BRIEF DESCRIPTION OF THE DRAWINGS

The present disclosure will be better understood with reference to the drawings, in which.

DETAILED DESCRIPTION OF THE DRAWINGS

The present disclosure provides a method for pairing a first computing device with a second computing device, the method comprising: detecting motion at the first computing device; determining, at the first computing device, that a pattern of the detected motion corresponds with a saved motion pattern; and activating a communications subsystem on the first computing device based on the determining to begin a pairing process.

The present disclosure further provides a system for pairing a first computing device with a second computing device, the system comprising: the first computing device; the second computing device; and the third computing device; wherein the system is configured to: detect motion at the first computing device; determine, at the first computing device, that a pattern of the detected motion corresponds with a saved motion pattern; and activate a communications subsystem on the first computing device based on the determining to begin a pairing process.

In the embodiments described below, the pairing of the container is done with a trailer chassis which is connected to a tractor. However, in other cases, the pairing may be made on other shipping containers and transportation vehicles, including, but not limited to, railcars, trucks, automobiles, among others. The embodiments below are therefore illustrative of the methods and systems of the present disclosure, but are not meant to be limiting.

As provided above, currently operators have no way to know when containers are loaded onto a chassis, and which chassis a particular container is loaded onto, causing logistical headaches. In this regard, a container may have a first sensor apparatus mounted to it. The first sensor apparatus may be used to measure, for example, the amount of cargo in a container and other metrics such as temperature, pressure and humidity.

Similarly, a vehicle such as a truck or rail chassis may have a second sensor apparatus mounted on it. The second sensor apparatus may provide cellular connectivity or other communication means to a cloud to report to various servers and may include, in some cases, sensors to provide information such as GPS location information.

In accordance with the embodiments of the present disclosure, a container on/off detector may further be used with the vehicle. The container on/off detector may, in some cases, be a part of the second sensor apparatus. In other cases such container on/off detector may be provided through an accessory mounted to the truck or rail chassis which communicates with the second sensor apparatus, for example using a short-range radio frequency or Bluetooth low energy (BLE) radio.

Reference is now made to FIG. 1.

Figure 1A:
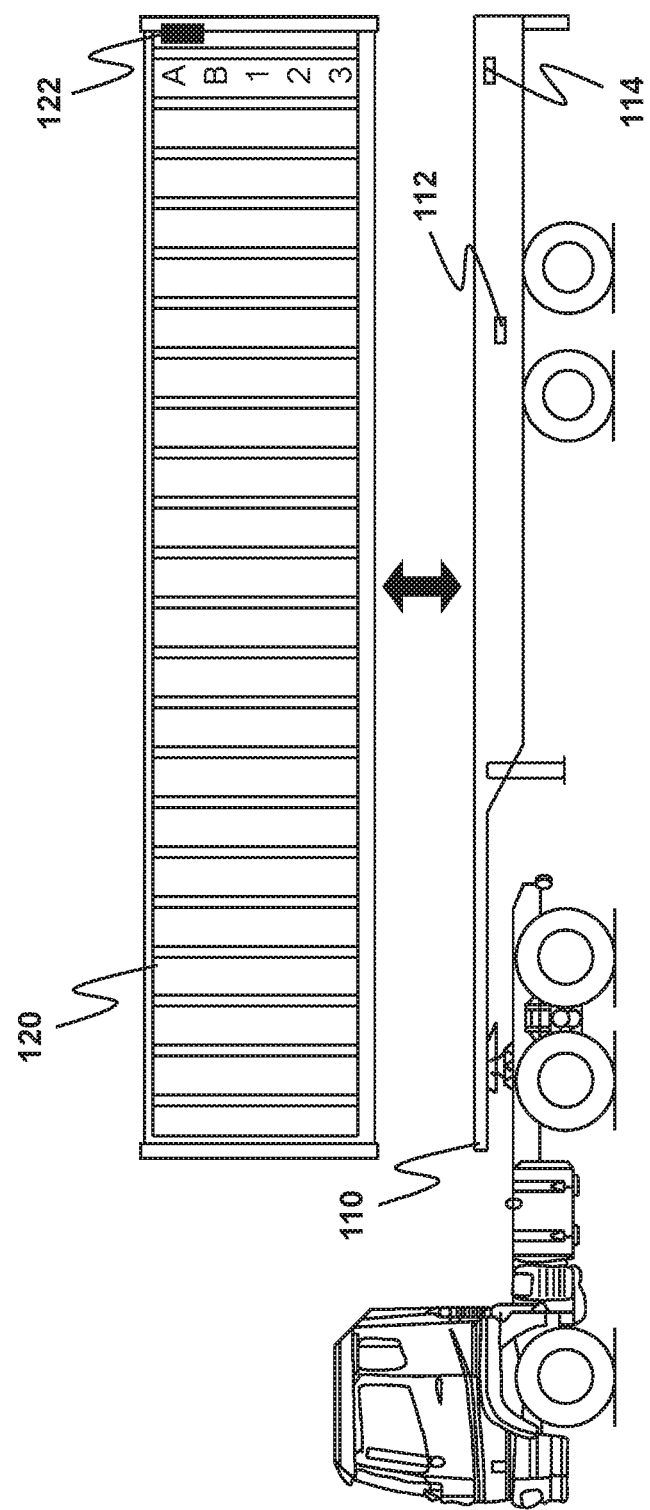
FIG. 1A is a side elevational view of a trailer chassis adapted to receive shipping containers, the figure showing an example placement of a sensor apparatus.

In the embodiment of FIG. 1A, example truck trailer 110 is shown. In one embodiment, a computing device may be mounted within the chassis of the trailer. For example, in one embodiment the computing device may be mounted above the rear wheels of the truck trailer 110. This is shown, for example, with vehicle sensor apparatus 112 in the embodiment of FIG. 1A.

However, in other cases it may be beneficial to have a different position for the vehicle sensor apparatus. Further, in some embodiments it may be useful to have a plurality of such sensor apparatuses within the trailer 110.

Figure 1B:
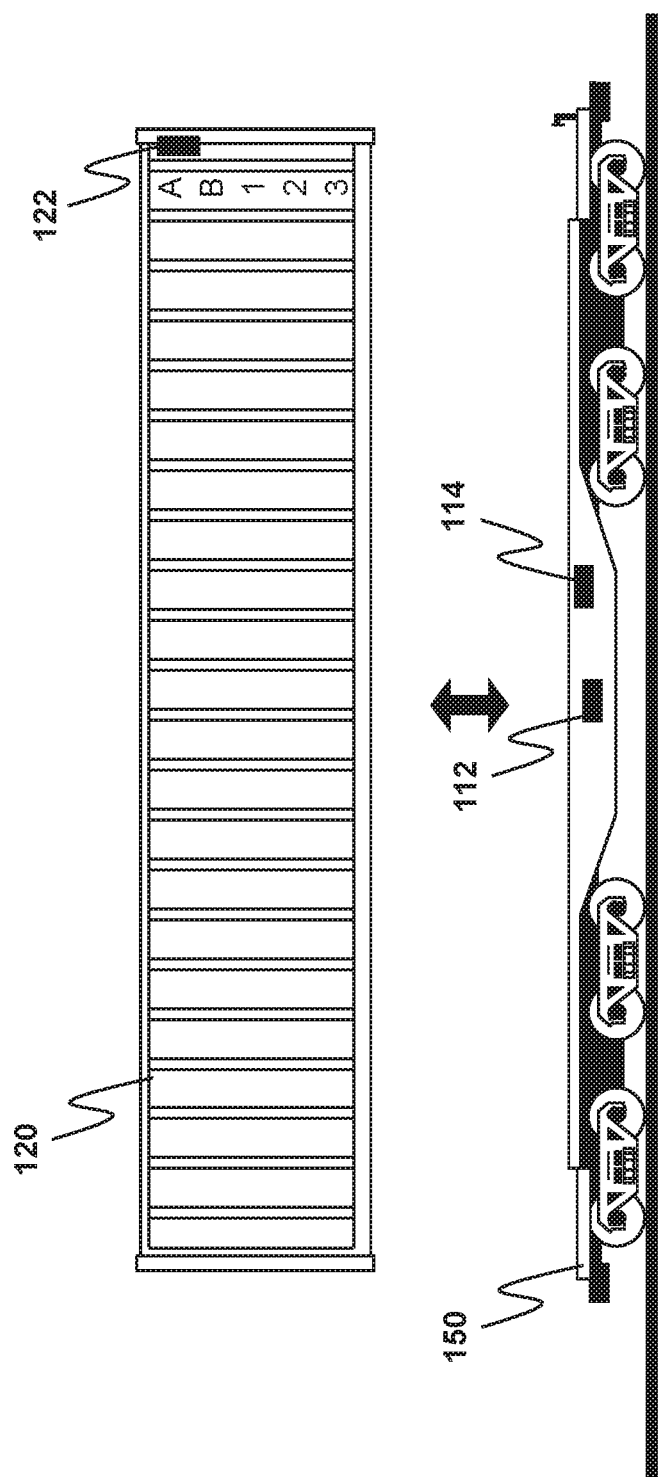
FIG. 1B is a side elevational view of a train chassis adapted to receive shipping containers, the figure showing an example placement of a sensor apparatus.

A further example, shown in FIG. 1B, provides an example train chassis 150 which may have a vehicle sensor apparatus 112 mounted thereon.

Further, in the embodiment of FIGS. 1A and 1B, a container on/off detector 114 is shown mounted to the chassis. In this case, the container on/off detector 114 may communicate with the vehicle sensor apparatus 112 through any wired or wireless communications mechanism.

In the embodiment of FIGS. 1A and 1B, trailer 110 or rail chassis 150 is adapted to secure and carry a shipping container 120 thereon. Information on whether the shipping container 120 is present or not would be useful to a transportation company.

In this regard, shipping container 120 is configured with a container sensor apparatus 122, which may be used for cargo monitoring, among other functionality. Container sensor apparatus may further include a communications subsystem, as described below, to allow the container sensor apparatus to pair with vehicle sensor apparatus 112.

Apparatus

Figure 2:
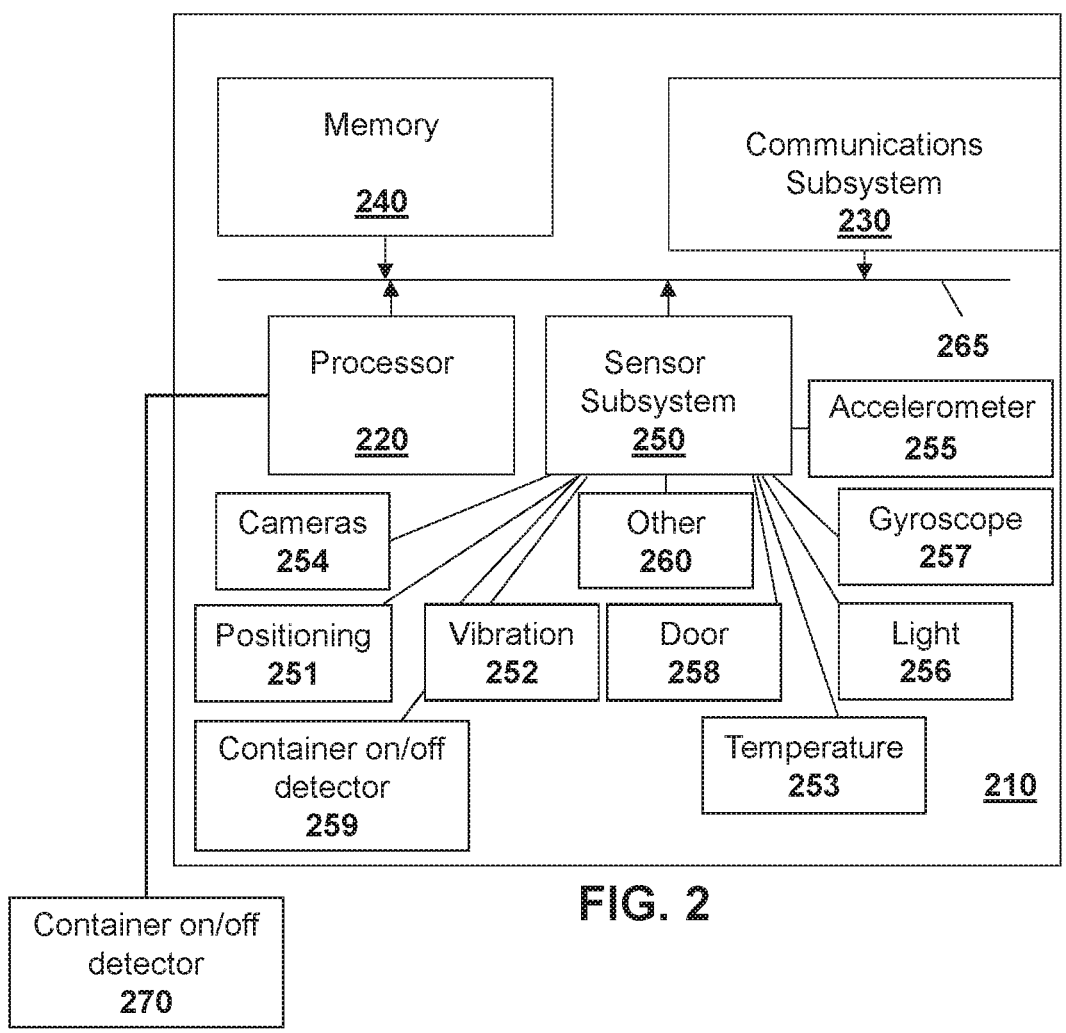
FIG. 2 is block diagram of an example sensor apparatus capable of being used for embodiments of the present disclosure.

One sensor apparatus for a vehicle, chassis, trailer, container, or other transportation asset is shown with regard to FIG. 2. The sensor apparatus of FIG. 2 is however merely an example and other sensing devices could equally be used in accordance with the embodiments of the present disclosure.

Reference is now made to FIG. 2, which shows an example sensor apparatus 210. Sensor apparatus 210 can be any computing device or network node. Such sensor apparatus or network node may include any type of electronic device, including but not limited to, mobile devices such as smartphones or cellular telephones. Examples can further include fixed or mobile devices, such as internet of things (IoT) devices, endpoints, home automation devices, medical equipment in hospital or home environments, inventory tracking devices, environmental monitoring devices, energy management devices, infrastructure management devices, vehicles or devices for vehicles, fixed electronic devices, among others.

Sensor apparatus 210 comprises a processor 220 and at least one communications subsystem 230, where the processor 220 and communications subsystem 230 cooperate to perform the methods of the embodiments described herein. Communications subsystem 230 may, in some embodiments, comprise multiple subsystems, for example for different radio technologies. For example, a sensor apparatus 210 mounted to a vehicle may have a cellular or satellite communications system to allow the sensor apparatus to report to an asset tracking server, but may also have a short range communications system to communicate with sensors or other apparatuses on associate with sensor apparatus 210. Conversely a sensor apparatus 210 mounted to a container may only contain a short range communications system to pair with nearby vehicles.

Therefore, communications subsystem 230 allows sensor apparatus 210 to communicate with other devices or network elements. Communications subsystem 230 may use one or more of a variety of communications types, including but not limited to cellular, satellite, Bluetooth™, Bluetooth™ Low Energy, Wi-Fi, wireless local area network (WLAN), sub-giga hertz radios, near field communications (NFC), IEEE 802.15, wired connections such as Ethernet or fiber, among other options.

As such, a communications subsystem 230 for wireless communications will typically have one or more receivers and transmitters, as well as associated components such as one or more antenna elements, local oscillators (LOs), and may include a processing module such as a digital signal processor (DSP) or System on Chip (SOC). As will be apparent to those skilled in the field of communications, the particular design of the communication subsystem 230 will be dependent upon the communication network or communication technology on which the sensor apparatus is intended to operate.

Processor 220 generally controls the overall operation of the sensor apparatus 210 and is configured to execute programmable logic, which may be stored, along with data, using memory 240. Memory 240 can be any tangible, non-transitory computer readable storage medium, including DRAM, Flash, optical (e.g., CD, DVD, etc.), magnetic (e.g., tape), flash drive, hard drive, or other memory known in the art.

Alternatively, or in addition to memory 240, sensor apparatus 210 may access data or programmable logic from an external storage medium (not shown), for example through communications subsystem 230.

In the embodiment of FIG. 2, sensor apparatus 210 may utilize a plurality of sensors, which may either be part of sensor apparatus 210 in some embodiments or may communicate with sensor apparatus 210 in other embodiments. For internal sensors, processor 220 may receive input from a sensor subsystem 250.

Examples of sensors in the embodiment of FIG. 2 include a positioning sensor 251, a vibration sensor 252, a temperature sensor 253, one or more image sensors/cameras 254, accelerometer 255, light sensors 256, gyroscopic sensors 257, a door sensor 258, a container on/off detector 259, and other sensors 260. Other sensors may be any sensor that is capable of reading or obtaining data that may be useful for the sensor apparatus 210. However, the sensors shown in the embodiment of FIG. 2 are merely examples, and in other embodiments, different sensors or a subset of sensors shown in FIG. 2 may be used.

Further, if a sensor apparatus 210 is associated with a container, it may have different sensors than a sensor apparatus 210 associated with a vehicle. The sensor apparatus 210 associated with a container may need to know a cargo loading status, temperature, tilt, or other information to ensure that cargo is transported without specified parameters in some cases. A sensor apparatus 210 associated with a vehicle may need to know the position of the vehicle and be capable of communicating with a server in some cases. Other examples however would allow the configuration of a sensor apparatus on a vehicle and/or on a container to suit the application the sensor apparatus is being used for.

Communications between the various elements of sensor apparatus 210 may be through an internal bus 265 in one embodiment. However, other forms of communication are possible.

In the embodiment of FIG. 2, rather than an internal container on/off detector 259, in some cases the container on/off detector may be external to the sensor apparatus and may be controlled by sensor apparatus 210. Container on/off detector 270 may, for example, be mounted together with sensor apparatus 210 or may form part of sensor apparatus 210. A single or multiple container on/off detectors can be mounted on the frame of the chassis to detect when a container is loaded on or unloaded from the chassis. The container on/off detector may, in some embodiments, consist of a microprocessor, a sensor such as Radar, LiDAR, laser, accelerometer, strain gauge, switch, among others, a battery, and a short-range technology radio transmitter (Bluetooth, IEEE 802.15.4, or Wi-Fi).

Container on/off detector 259 or 270 would typically provide information about whether a container is loaded onto the chassis. Further, in some cases the container on/off detector 259 or 270 can provide an indication of whether the cargo is about to be loaded. In this case, a range detector such as a millimeter wave radar sensor could be part of the container on/off detector. In other cases the container on/off detector could include switches, lasers, accelerometers, strain gauges, or other similar mechanism to detect container loading or unloading.

Figure 3:
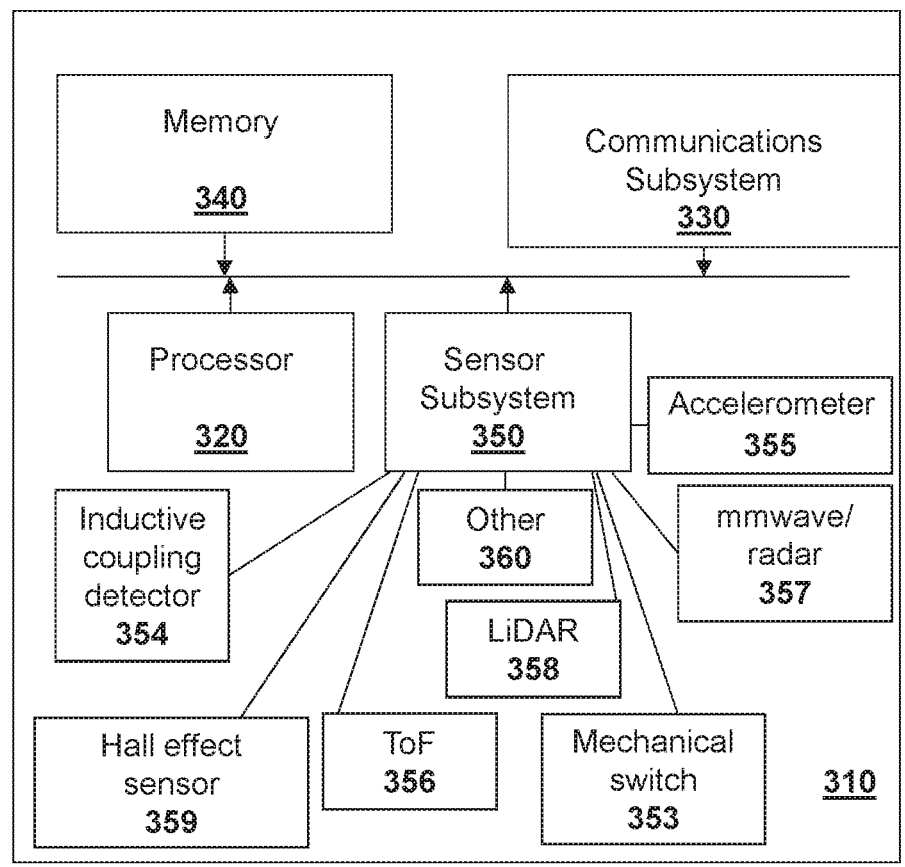
FIG. 3 is a block diagram of an example container on/off detector capable of being used for the embodiments of the present disclosure.

In particular, reference is now made to FIG. 3, which shows a simplified diagram of a container on/off detector. Container on/off detector 310 comprises a processor 320 and at least one communications subsystem 330, where the processor 320 and communications subsystem 330 cooperate to perform the methods of the embodiments described herein. Communications subsystem 330 may, in some embodiments, comprise multiple subsystems, for example for different radio technologies. For example, a container on/off detector 310 mounted to a vehicle may have a short range communications system to communicate with a sensor apparatus 210.

Therefore, communications subsystem 330 allows container on/off detector 310 to communicate with other devices or network elements. Communications subsystem 330 may use one or more of a variety of communications types, including but not limited to Bluetooth™, Bluetooth™ Low Energy, Wi-Fi, wireless local area network (WLAN), sub-giga hertz radios, near field communications (NFC), IEEE 802.15, wired connections such as Ethernet or fiber, among other options.

As such, a communications subsystem 330 for wireless communications will typically have one or more receivers and transmitters, as well as associated components such as one or more antenna elements, local oscillators (LOs), and may include a processing module such as a digital signal processor (DSP) or System on Chip (SOC). As will be apparent to those skilled in the field of communications, the particular design of the communication subsystem 330 will be dependent upon the communication network or communication technology on which the sensor apparatus is intended to operate.

Processor 320 generally controls the overall operation of the container on/off detector 310 and is configured to execute programmable logic, which may be stored, along with data, using memory 340. Memory 340 can be any tangible, non-transitory computer readable storage medium, including DRAM, Flash, optical (e.g., CD, DVD, etc.), magnetic (e.g., tape), flash drive, hard drive, or other memory known in the art.

Alternatively, or in addition to memory 340, container on/off detector 310 may access data or programmable logic from an external storage medium (not shown), for example through communications subsystem 330.

In the embodiment of FIG. 3, container on/off detector 310 may utilize a plurality of sensors. For internal sensors, processor 320 may receive input from a sensor subsystem 350.

Examples of sensors in the embodiment of FIG. 3 include a mechanical switch 353, an inductive coupling detector 354, and accelerometer 355, Time of Flight sensor 356, a millimetre wave or radar detector 357, LiDAR 358, Hall effect sensor 359, and other sensors 360. Other sensors may be any sensor that is capable of reading or obtaining data that may be useful for the container on/off detector 310. However, the sensors shown in the embodiment of FIG. 3 are merely examples, and in other embodiments, different sensors or a subset of sensors shown in FIG. 3 may be used.

Referring again to FIG. 2, a sensor apparatus 210 may be affixed to any fixed or portable platform. For example, sensor apparatus 210 may be affixed to shipping containers or truck trailers in one embodiment. In other embodiments, sensor apparatus 210 may be affixed to a chassis of a trailer, as for example shown in FIG. 1. In other cases, the sensor apparatus 210 may be affixed to any transportation asset for which load detection is needed, including self-propelled vehicles (e.g., automobiles, cars, trucks, buses, etc.), railed vehicles (e.g., trains and trams, etc.), and other types of vehicles including any combinations of any of the foregoing, whether currently existing or after arising, among others.

In other cases, sensor apparatus 210 may be part of a container that could be carried on or within a vehicle, for example container 120 from FIG. 1. In accordance with the present disclosure, the term container may include any sort of cargo or item transportation such as vehicles, intermodal containers, shipping bins, lock boxes, and other similar vessels.

Such a sensor apparatus 210 or container on/off detector 310 may be a power limited device. For example, sensor apparatus 210 or container on/off detector 310 could be a battery-operated device that can be affixed to a shipping container or trailer in some embodiments. Other limited power sources could include any limited power supply, such as a small generator or dynamo, a fuel cell, solar power, energy harvesting, among other options.

In other embodiments, sensor apparatus 210 or container on/off detector 310 may utilize external power, for example from the battery or power system of a tractor pulling the trailer, via a wiring harness connected to a 7-pin plug, from a land power source for example on a plugged-in recreational vehicle or from a building power supply, among other options. Thus, the sensor apparatus 210 or container on/off detector 310 may also be connected to a power cord that receives its power from a power source.

External power may further allow for recharging of batteries to allow the sensor apparatus 210 or container on/off detector 310 to then operate in a power limited mode again. Recharging methods may also include other power sources, such as, but not limited to, solar, electromagnetic, acoustic or vibration charging.

The sensor apparatus from FIG. 2 and container on/off detector from FIG. 3 may be used in a variety of environments. One example environment in which the sensor apparatus may be used is shown with regard to FIG. 4.

Figure 4:
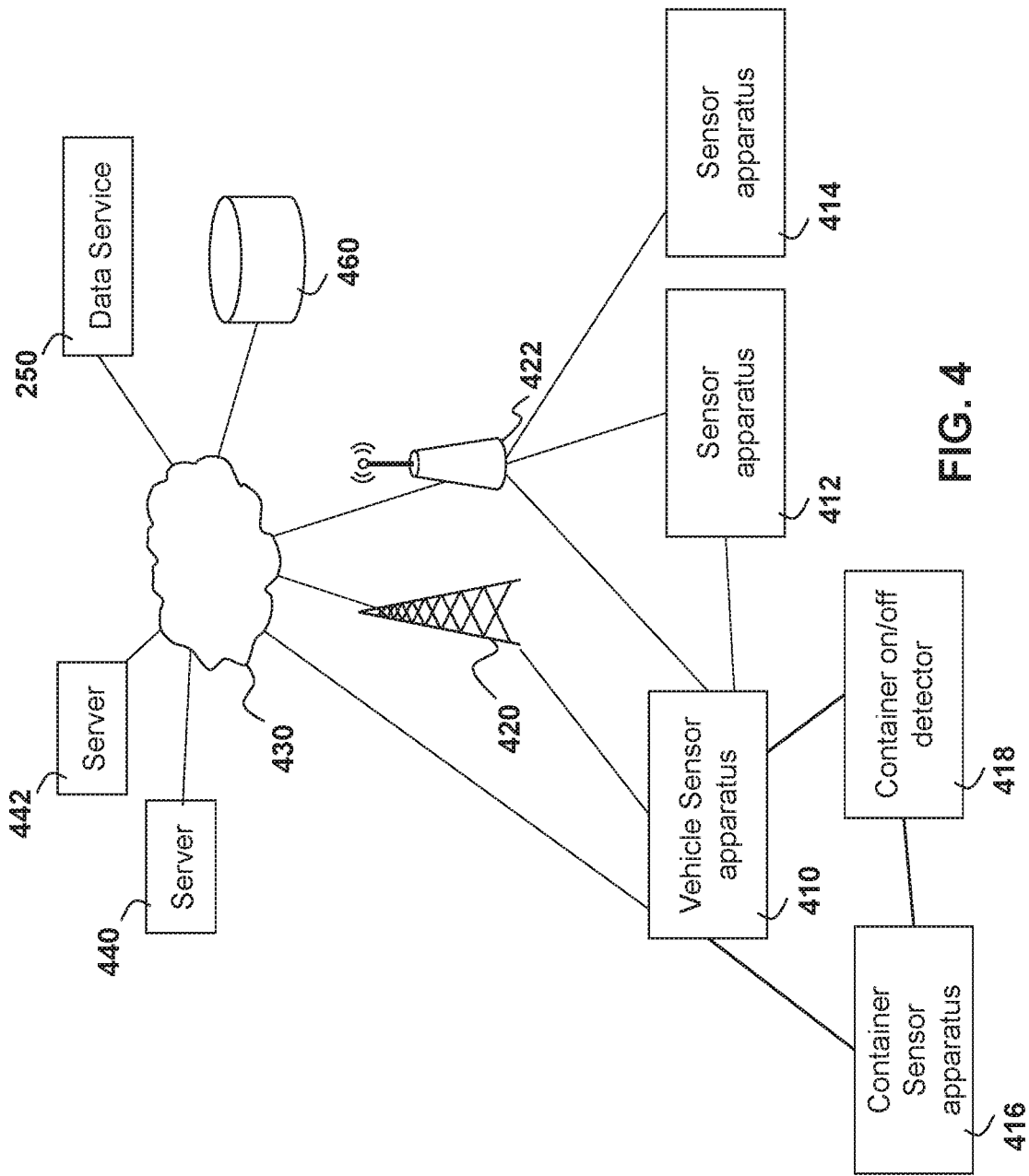
FIG. 4 is a block diagram showing an example architecture for the sensor apparatus of FIG. 2 and container on/off detector of FIG. 3.

Referring to FIG. 4, four sensor apparatuses, namely vehicle sensor apparatus 410, sensor apparatus 412, sensor apparatus 414, and container sensor apparatus 416 are provided.

In the example of FIG. 4, vehicle sensor apparatus 410 may communicate through a cellular base station 420 or through an access point 422. Access point 422 may be any wireless communication access point.

Further, in some embodiments, sensor apparatus 410 could communicate through a wired access point such as Ethernet or fiber, among other options.

The communication may then proceed over a wide area network such as Internet 430 and proceed to servers 440 or 442.

Similarly, sensor apparatus 412 and sensor apparatus 414 may communicate with server 440 or server 442 through one or both of the base station 420 or access point 422, among other options for such communication.

In other embodiments, any one of sensor apparatuses 410, 412 or 414 may communicate through satellite communication technology. This, for example, may be useful if the sensor apparatus is travelling to areas that are outside of cellular coverage or access point coverage.

In other embodiments, sensor apparatus 412 may be out of range of access point 422, and may communicate with sensor apparatus 410 to allow sensor apparatus 410 to act as a relay for communications.

Further, a container on/off detector 418 may only have short-range communications capabilities and may therefore pair with and communicate with a vehicle sensor apparatus 410.

A container sensor apparatus 416 may establish communications with container on/off detector 418 in one embodiment to enable pairing with the vehicle sensor apparatus 410. This then allows communications from the container sensor apparatus 416 to be relayed through vehicle sensor apparatus 410 to server 440 or server 442.

Communication between sensor apparatus 410 and server 440 may be one directional or bidirectional. Thus, in one embodiment sensor apparatus 410 may provide information to server 440 but server 440 does not respond. In other cases, server 440 may issue commands to sensor apparatus 410 but data may be stored internally on sensor apparatus 410 until the sensor apparatus arrives at a particular location, possibly during a particular time window. In other cases, two-way communication may exist between sensor apparatus 410 and server 440.

A server, central server, processing service, endpoint, Uniform Resource Identifier (URI), Uniform Resource Locator (URL), back-end, and/or processing system may be used interchangeably in the descriptions herein. The server functionality typically represents data processing/reporting that are not closely tied to the location of sensor apparatuses 410, 412, 414, 416 etc. For example, the server may be located essentially anywhere so long as it has network access to communicate with sensor apparatuses 410, 412, 416, 418, etc.

Server 440 may, for example, be a fleet management centralized monitoring station. In this case, server 440 may receive information from a sensor apparatus associated with various trailers or cargo containers, providing information such as the location of such cargo containers, the temperature within such cargo containers, any unusual events including sudden decelerations, temperature warnings when the temperature is either too high or too low, cargo loading status for the trailer, the mass of the trailer, among other data. The server 440 may compile such information and store it for future reference.

Other examples of functionality for server 440 are possible.

In the embodiment of FIG. 4, servers 440 and 442 may further have access to third-party information or information from other servers within the network. For example, a data services provider 450 may provide information to server 440. Similarly, a data repository or database 460 may also provide information to server 440.

For example, data services provider 450 may be a subscription-based service used by server 440 to obtain current road and weather conditions, or may be an inventory control system in some cases.

Data repository or database 460 may for example provide information such as image data associated with a particular location, aerial maps, detailed street maps, or other such information.

The types of information provided by data service provider 450 or the data repository or database 460 is not limited to the above examples and the information provided could be any data useful to server 440.

In some embodiments, information from data service provider 450 or the data repository from database 460 can be provided to one or more of sensor apparatuses 410, 412, or 414 for processing at those sensor apparatuses.

Sensor apparatuses such as those described in FIGS. 2, 3 and 4 above may be used to detect the loading or unloading of a container onto or from a vehicle or trailer.

Pairing of Vehicle and Container Sensor Apparatuses

In accordance the various embodiments of the present disclosure, pairing of two power limited devices associated with containers and transportation vehicles are described.

As indicated above, currently fleet management systems do not allow operators to know when containers are loaded onto a chassis and which chassis a container is loaded onto while a vehicle is stationary in a container yard. This causes logistical headaches.

Therefore, in accordance with the present disclosure, a container has a container sensor apparatus mounted to it so that it can measure the amount of cargo in the container and other metrics such as temperature, pressure, humidity, among other examples.

A chassis or other vehicle or vehicle component has a vehicle sensor apparatus mounted to it. This vehicle sensor apparatus may provide sensor connectivity to the cloud as well as GPS location information in some embodiments.

A container on/off detector may determine when a container is mounted on and off the chassis and includes a communication system to provide short range communications with the vehicle sensor apparatus.

In order to pair the container sensor apparatus and the vehicle sensor apparatus, when a container is lifted to be placed on a chassis, for example via a forklift, crane or other method, an accelerometer and gyroscopic sensor in the container sensor apparatus may be turned on to record the motion event.

Figure 5:
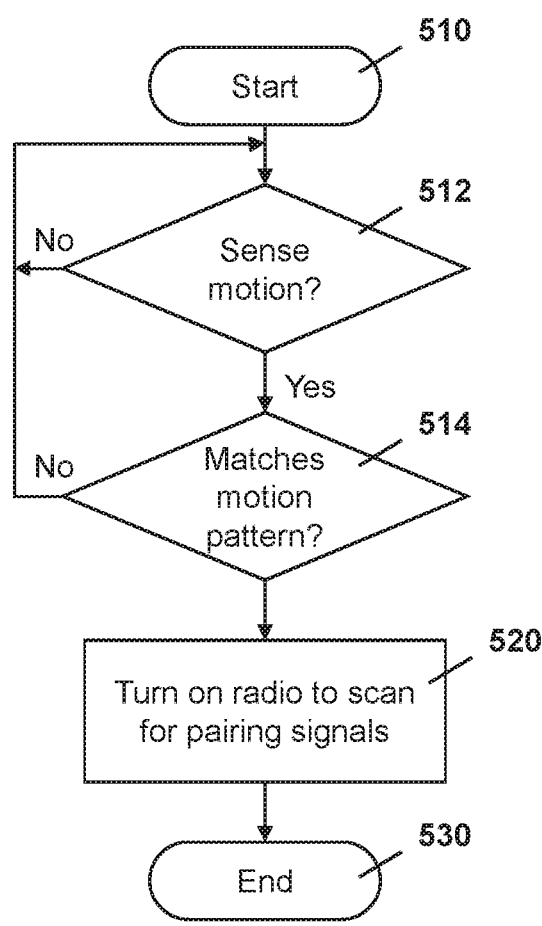
FIG. 5 is a process diagram showing the process of turning on a radio on a container sensor apparatus.

Reference is now made to FIG. 5. In the embodiment of FIG. 5, a process starts at block 510 and proceeds to block 512 in which a check is made to determine whether a motion event is detected. Such motion event may, for example, consist of an (x, y, z) motion and rotation measurement.

If no motion event is detected at block 512 then the process proceeds back to block 512 to continue to monitor for a motion event.

Once a motion event is detected, the process proceeds to block 514 in which the motion is event is recorded to determine if the motion event matches a saved "motion pattern" for mounting the container onto the vehicle. For example, the pattern could contain a +z motion followed by a −z motion or some other predetermined "motion pattern". In some cases, the motion pattern could include container rotation or the pattern made when the container is set on a chassis. The motion pattern could be relatively complex, and in some cases a plurality of motion patterns could be stored on the container sensor apparatus. For example, the motion pattern for a container being lifted from a ship by a crane may be stored as a first motion pattern, while a motion pattern for the container being lifted by a forklift could be a second motion pattern. Other examples or more motion patterns could be stored at the sensor apparatus. The container sensor apparatus may therefore have a plurality of motion patterns that are stored on the device which could all be checked at block 514. The condition at block 514 may be true if any one of the stored motion patterns matches the motion pattern detected at the container sensor apparatus.

In one embodiment, the container sensor apparatus could have such motion pattern preconfigured within it. For example, this could be done at the factory or prior to deploying the sensor apparatus to the container. In other cases, the motion patterns could be pushed to the container sensor apparatus. For example, this may be done when the container sensor apparatus is in communication with any hub or other sensor apparatus that is capable of connecting to a server for pushing the information. Other options are possible.

If the motion pattern does not match a loading motion pattern, the process proceeds back to block 512 to continue to sense whether motion exists.

Once the motion pattern is recognized to be true, the process proceeds to block 520 in which the container sensor apparatus may turn on its short range communications system, such as radio frequency or Bluetooth low energy system, and attempt a scan to see any nearby container on/off detectors are found. The process then proceeds to block 530 and ends.

As will be appreciated by those skilled in the art, an accelerometer or other motion sensing detector uses minimal power, while the radio transceiver uses a significant amount of power. Therefore, by using the internal sensors within the container sensor apparatus to limit the duration of the radio on time, battery savings are realized at the container sensor apparatus.

Figure 6:
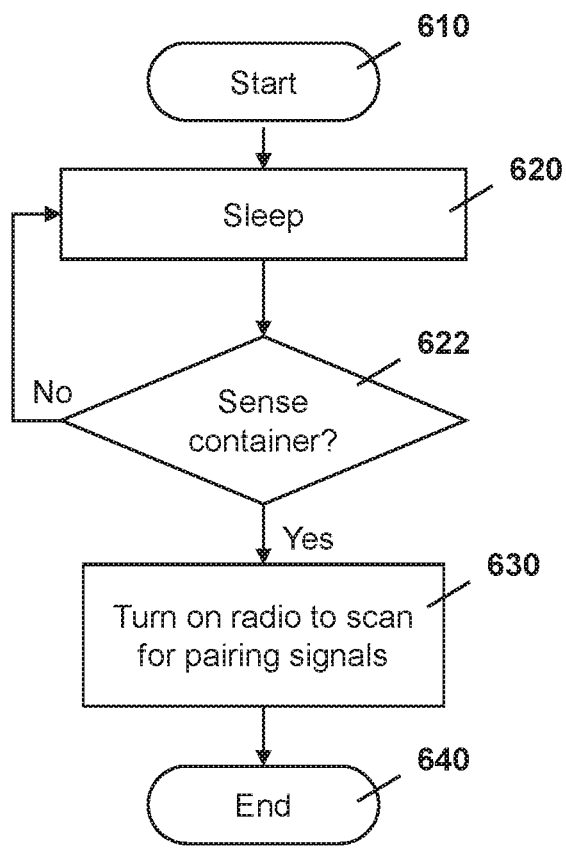
FIG. 6 is a process diagram showing a process for turning on a radio on a container on/off detector.

On the vehicle side, a container on/off detector 310 is in a sleep mode and will not turn on unless it detects a container on the vehicle. Thus, reference is now made to FIG. 6. In the embodiment of FIG. 6, the process starts at block 610 and proceeds to block 620 in which the container on/off detector is in a sleep mode.

The process next proceeds to block 622 in which a check is made to determine whether the container on/off detector senses a container. The container on/off detector may detect the container being on it through inductive coupling, millimeter wave or radar detection, Hall effect sensors, time of flight sensors, mechanical switches or other means available.

If no container is detected the process proceeds back to block 620 in which the container on/off detector resumes the sleep mode.

Once the container on/off detector determines that a container is on the chassis, it may turn on its short range communications system, as shown at block 630

The process then proceeds to block 640 and ends.

Once the short range communications system of the container sensor apparatus and the short range communications subsystem of the container on/off detector are both on, they will both attempt to pair.

Figure 7:
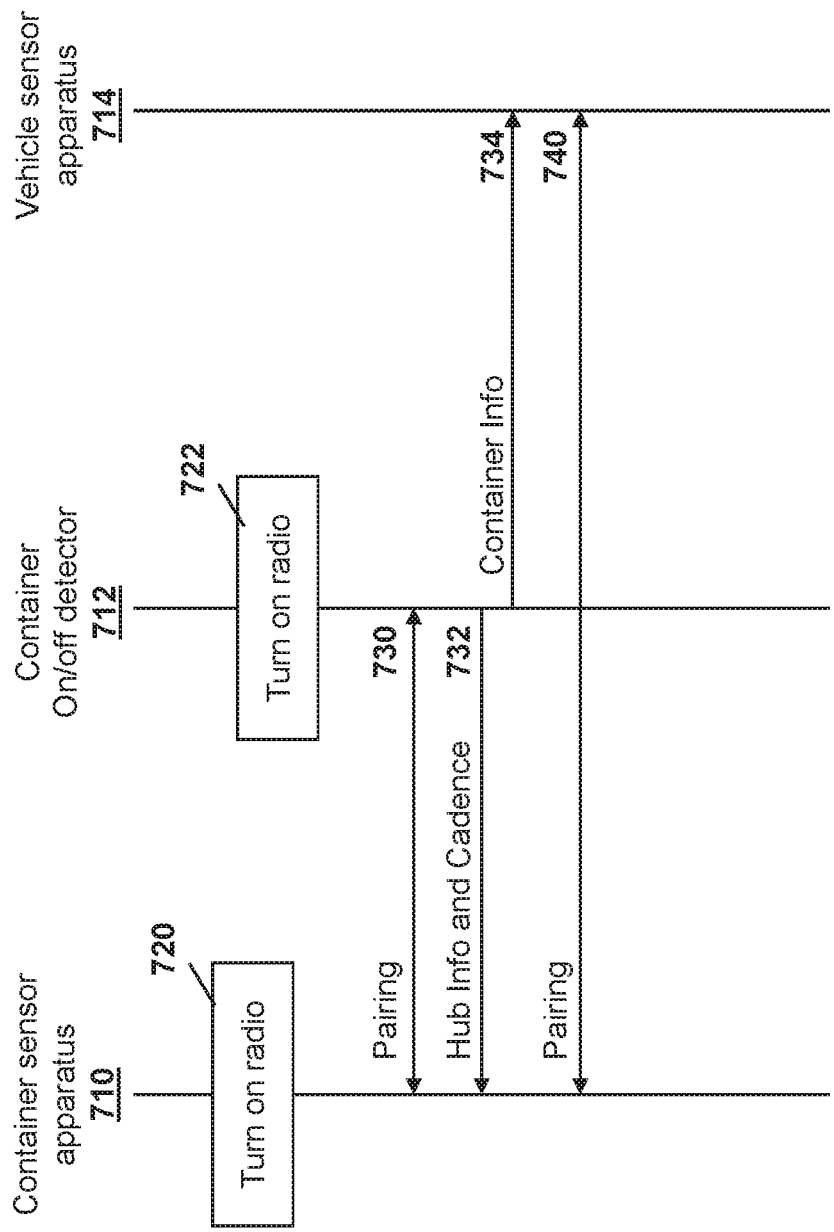
FIG. 7 is a dataflow diagram showing the pairing of a container sensor apparatus with a vehicle sensor apparatus.

In this regard, reference is made to FIG. 7. In the embodiment of FIG. 7, a container sensor apparatus 710 is attempting to pair with a vehicle sensor apparatus 714 using a container on/off detector 712.

The container sensor apparatus 710 may turn on its radio at block 720 in accordance with the embodiment of FIG. 5 described above.

Similarly, the container on/off detector 712 may turn on its radio at block 722 in accordance with the embodiment of FIG. 6 described above.

Once both radios are on, then a pairing can occur between the container sensor apparatus 710 and the container on/off detector 712, as shown with messaging 730. In some cases, since the container on/off detector does not have knowledge of the identifier for the container, the pairings could use a generic personal area network (PAN) identifier. In this regard, the container on/off detector 712 may have a mechanism to set a PAN with a default PAN ID.

In one embodiment, the pairing may utilize the received signal strength indicator (RSSI) to establish the pairing, RSSI is not perfect, but, because the radios of the plurality of containers and plurality of vehicles are not on until a trigger is met, there will be less radios that are broadcasting for a pairing and hence the use of the combination of an RSSI along with the limited number radios allows a pairing to occur.

In another embodiment, the pairing may utilize an Angle of Arrival (AoA) and Angle of Departure (AoD) as for example described in BLE 5.x to determine and establish pairing.

Other options for pairing are possible.

Once paired, the container on/off detector 712 may provide information about the vehicle sensor apparatus 714, also referred to as a "hub", and provide cadence information about when the vehicle sensor apparatus 714 turns on its radio, to the container sensor apparatus 710. This is shown with messaging 732.

Subsequently, when the vehicle sensor apparatus 714 turns on its radio, the container on/off detector 712, which is already paired with the vehicle sensor apparatus 714, may provide container information to the vehicle sensor apparatus 714 in messaging 734.

Pairing can then occur between the vehicle sensor apparatus 714 and the container sensor apparatus 710, shown with messaging 740.

Therefore, utilizing the embodiment of FIG. 7, a container sensor apparatus 710 and a vehicle sensor apparatus 714 may be paired in a crowded container yard with a plurality of containers and vehicles, even if the vehicle is not in motion, therefore easing logistical headaches for fleet operators.

Figure 8:
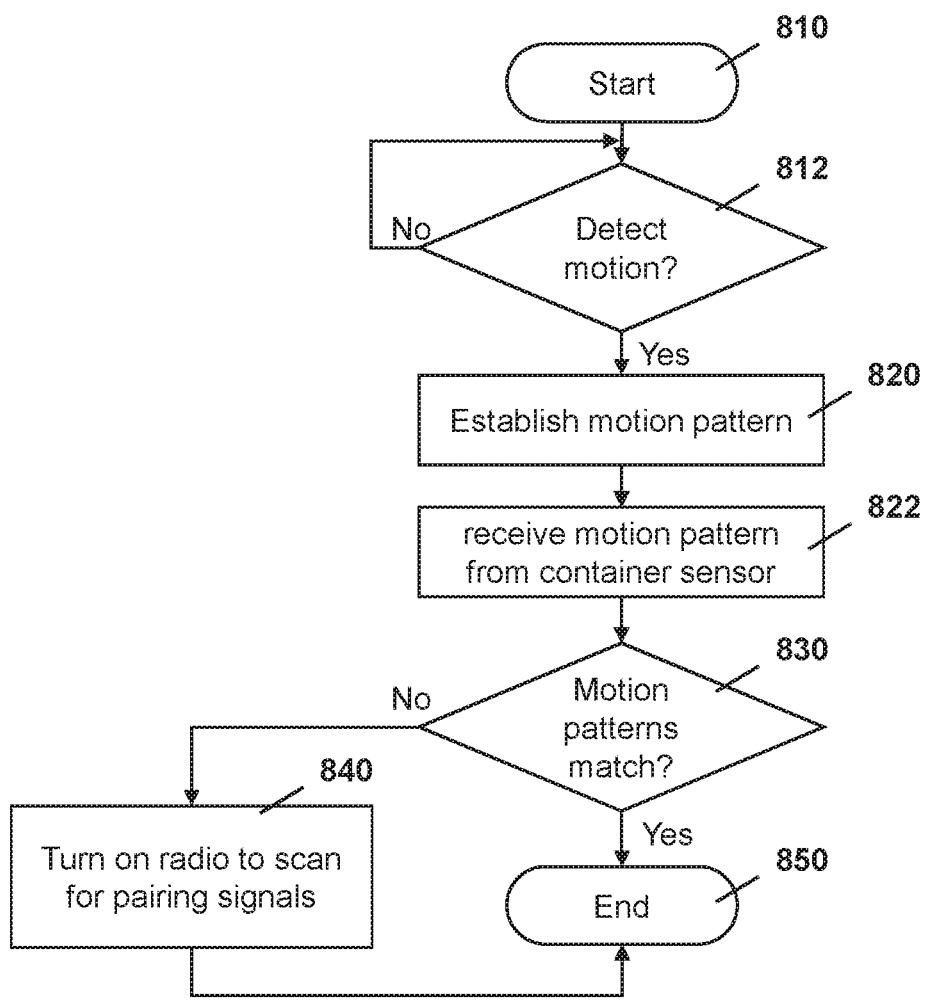
FIG. 8 is a process diagram showing a process at a vehicle sensor apparatus for confirming the pairing with a container sensor apparatus.

The pairing as illustrated in FIG. 7 is performed without motion of the chassis. The container sensor apparatus and the vehicle sensor apparatus would then stayed paired, even if no motion occurred for hours, days or weeks. In some cases, the container pairing may be verified once the vehicle starts moving. Specifically, reference is now made to FIG. 8. In the embodiment of FIG. 8 the process starts at block 810 and proceeds to block 812 in which a vehicle sensor apparatus may check to determine whether motion is detected at the vehicle. If no, the process continues to loop to block 812 until motion is detected.

Once motion is detected the process proceeds from block 812 to block 820 in which a motion pattern for the vehicle is established. This may be based on input from an accelerometer and/or gyroscopic sensor on the vehicle sensor apparatus, for example.

Subsequently, the vehicle sensor apparatus may receive a motion pattern from the container sensor, as shown at block 822. The motion pattern may be received from the container sensor in response to a query from the vehicle sensor apparatus in some cases. In other cases, the container sensor apparatus may detect motion and start the process on its own.

The process then proceeds to block 830 in which a check is made to determine whether motion patterns from the vehicle sensor apparatus and from the container sensor apparatus match. In particular, both the container and the vehicle accelerometers and gyroscopes would have similar characteristics, and this would serve as a safety check to ensure that the two devices are indeed linked and paired.

If the motion patterns do not match, or if the vehicle sensor apparatus does not receive the information at block 822, then this may indicate that the pairing is incorrect and the process proceeds to block 840 in which the vehicle sensor apparatus may turn on its radio to scan for pairing signals. The container sensor apparatus would similarly detect that it is not paired to the correct vehicle and would perform a similar process to establish the correct pairing.

From block 830, if the motion patterns match, or from block 840, the process proceeds to block 850 and ends.

In other embodiments, the pairing check may be based on an RSSI as the vehicle moves away from other vehicles in the container yard.

Other options for verifying the pairing are also possible.

For removing a container from a vehicle, a similar approach may be used using a predetermined "inverted motion pattern". In particular, for a container sensor apparatus, the process for removing the a container from the vehicle is shown with regard to FIG. 9.

Figure 9:
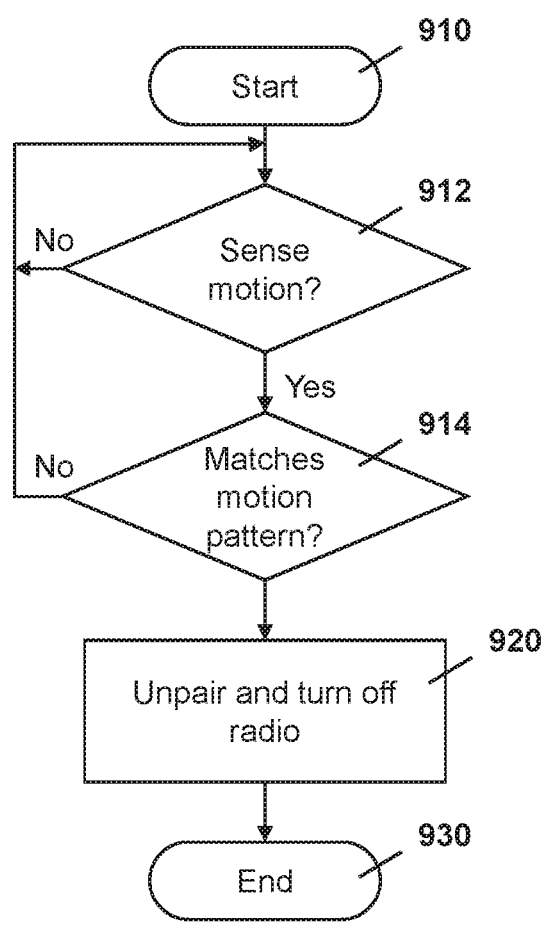
FIG. 9 is a process diagram showing a process for unpairing a container sensor apparatus from a vehicle sensor apparatus.

The embodiment of FIG. 9 starts at block 910 and proceeds to block 912 in which a check is made to determine whether the sensor apparatus senses any motion. If not, the process continues to loop at block 912 until motion is sensed.

Once motion is sensed, the process proceeds from block 912 to block 914 in which a check is made to determine whether the motion pattern of the motion matches that of the removal of a container from a chassis. For example, this could be the motion of the container when lifted by a crane or forklift based on information stored or provisioned at the container sensor apparatus.

If the motion pattern does not match the unloading of the container, the process proceeds back to block 912 in which further motion is checked.

Conversely, if the motion pattern matches the unloading pattern of any of the container motion patterns stored at the container sensor apparatus, then the process proceeds from block 914 to block 920 in which the container sensor apparatus unpairs from the vehicle sensor apparatus and further may turn off the radio to avoid wasting power.

From block 920, the process proceeds to block 930 and ends.

Figure 10:
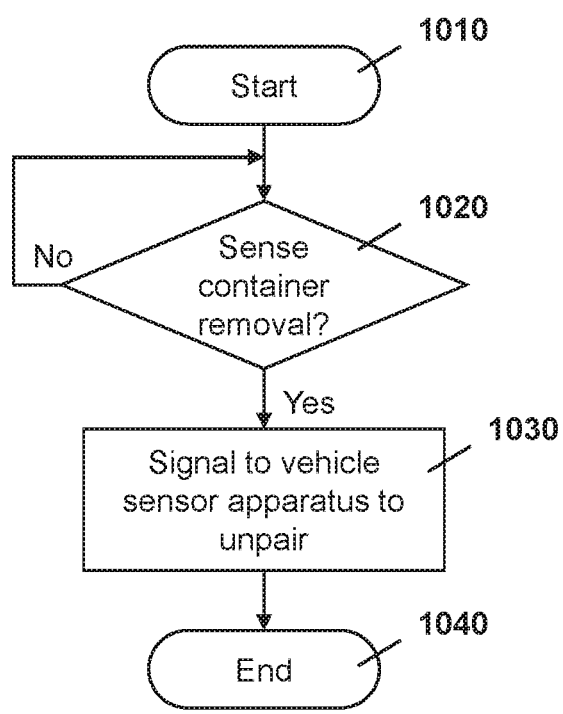
FIG. 10 is a process diagram showing the use of a container on/off detector for unpairing a vehicle sensor apparatus from a container sensor apparatus.

On the container on/off detector, a process may be used for unpairing the container from the vehicle. Reference is now made to FIG. 10.

The process of FIG. 10 starts at block 1010 and proceeds to block 1020 in which the container on/off detector may detect whether it senses container removal. If not, the process may proceed back to block 1022 continues to check for container removal.

Once the container on/off detector detects container removal, the process proceeds from block 1020 to block 1030 in which the container on/off detector may signal to the vehicle sensor apparatus to unpair the container.

The process then proceeds to block 1040 and ends.

A vehicle sensor apparatus, on receiving the message sent at block 1030, may unpair the container from itself and may further report such unpairing to the cloud or vehicle operations centers, among other options.

While the embodiment of FIG. 10 uses the container on/off detector, in some cases additional levels of checking can occur. For example, if the vehicle sensor apparatus detects motion, for example by using an accelerometer or gyroscopic sensor, while the container sensor apparatus detects no motion, this may indicate that the container and chassis have become unpaired.

Therefore, based on the above, a container motion pattern may be used to trigger the activation of a radio on a container sensor apparatus to allow for pairing of the container sensor apparatus to a vehicle sensor apparatus in potentially crowded circumstances with minimal battery utilization.

Servers

A server such as servers 440, 442 or 450 may be any network node. For example, one simplified server that may perform the embodiments described above is provided with regards to FIG. 11.

Figure 11:
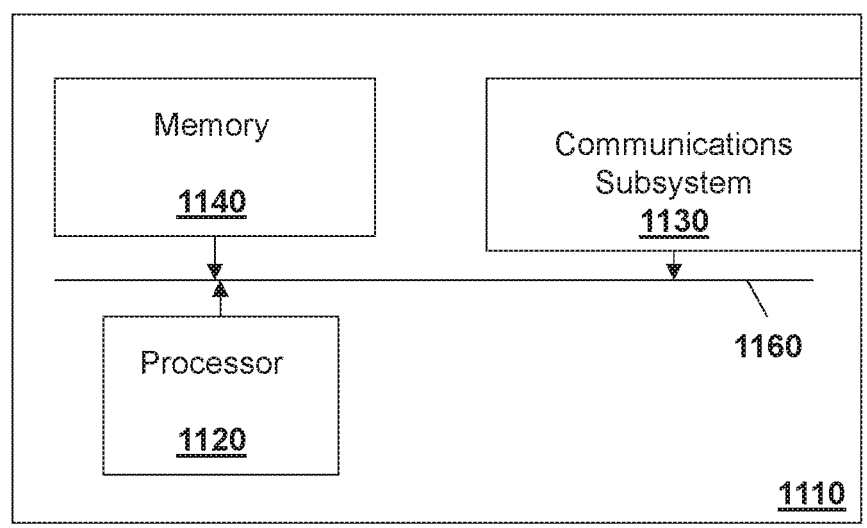
FIG. 11 is a block diagram of an example computing device or server capable of being used with the embodiments of the present disclosure.

In FIG. 11, server 1110 includes a processor 1120 and a communications subsystem 1130, where the processor 1120 and communications subsystem 1130 cooperate to perform the methods of the embodiments described herein.

The processor 1120 is configured to execute programmable logic, which may be stored, along with data, on the server 1110, and is shown in the example of FIG. 11 as memory 1140. The memory 1140 can be any tangible, non-transitory computer readable storage medium, such as DRAM, Flash, optical (e.g., CD, DVD, etc.), magnetic (e.g., tape), flash drive, hard drive, or other memory known in the art. In one embodiment, processor 1120 may also be implemented entirely in hardware and not require any stored program to execute logic functions.

Alternatively, or in addition to the memory 1140, the server 1110 may access data or programmable logic from an external storage medium, for example through the communications subsystem 1130.

The communications subsystem 1130 allows the server 1110 to communicate with other devices or network elements.

Communications between the various elements of the server 1110 may be through an internal bus 1160 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a single software product or packaged into multiple software products. In some cases, functions may be performed entirely in hardware and such a solution may be the functional equivalent of a software solution.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps is not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide communication to an electronic device. For example, rather than a typical server response, the server may also provision or indicate data for a content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method for pairing a first computing device with a second computing device, the method comprising:
   detecting motion at the first computing device from a motion detector of the first computing device;
   determining, at the first computing device, that a pattern of the detected motion corresponds with a saved motion pattern, the saved motion pattern comprising at least one of a rotation and a movement component in one of an X, Y, or Z axis;
   activating a communications subsystem on the first computing device based on the determining to begin a pairing process;
   detecting a trigger at a third computing device, the third computing device being associated with the second computing device, wherein upon detecting the trigger, a communications subsystem of the third computing device is activated for pairing the third computing device with the first computing device; and
   upon pairing of the first computing device and the third computing device, providing from the third computing device information about the second computing device to the first computing device.

2. The method of claim 1, wherein the first computing device utilizes the information for pairing with the second computing device.

3. The method of claim 1, wherein the information includes a cadence for a radio on the second computing device.

4. The method of claim 1, wherein the first computing device is a sensor apparatus associated with a shipping container, and wherein the saved motion pattern corresponds to the motion pattern for loading the shipping container onto a vehicle.

5. The method of claim 4, wherein a plurality of motion patterns corresponding to different loading scenarios are stored at the first computing device.

6. The method of claim 1, wherein the third computing device is a container on/off detector on a vehicle, and wherein the trigger comprises finding that a shipping container has been loaded onto the vehicle.

7. The method of claim 1, wherein the second computing device is a vehicle sensor apparatus capable of communicating with a network element to provide status information to the network element.

8. The method of claim 7, further comprising receiving, at the second computing device from a third computing device, information regarding the first computing device prior to the pairing of the first computing device with the second computing device.

9. A system for pairing a first computing device with a second computing device, the system comprising:
   the first computing device; and
   the second computing device;
   wherein the system is configured to:
      detect motion at the first computing device from a motion detector of the first computing device;
   determine, at the first computing device, that a pattern of the detected motion corresponds with a saved motion pattern, the saved motion pattern comprising at least one of a rotation and a movement component in one of an X, Y, or Z axis;
      activate a communications subsystem on the first computing device based on the determining to begin a pairing process;

detect a trigger at a third computing device, the third computing device being associated with the second computing device, wherein upon detecting the trigger, a communications subsystem of the third computing device is activated for pairing the third computing device with the first computing device; and upon pairing of the first computing device and the third computing device, provide from the third computing device information about the second computing device to the first computing device.

10. The system of claim 9, wherein the first computing device utilizes the information for pairing with the second computing device.

11. The system of claim 9, wherein the information includes a cadence for a radio on the second computing device.

12. The system of claim 9, wherein the first computing device is a sensor apparatus associated with a shipping container, and wherein the saved motion pattern corresponds to the motion pattern for loading the shipping container onto a vehicle.

13. The system of claim 12, wherein a plurality of motion patterns corresponding to different loading scenarios are stored at the first computing device.

14. The system of claim 9, wherein the third computing device is a container on/off detector on a vehicle, and wherein the trigger comprises finding that a shipping container has been loaded onto the vehicle.

15. The system of claim 9, wherein the second computing device is a vehicle sensor apparatus capable of communicating with a network element to provide status information to the network element.

16. The system of claim 15, wherein the system is further configured to receive, at the second computing device from a third computing device, information regarding the first computing device prior to the pairing of the first computing device with the second computing device.

* * * * *